United States Patent [19]
Fenton

[11] Patent Number: 4,608,072
[45] Date of Patent: Aug. 26, 1986

[54] METHOD AND APPARATUS FOR TRANSFERRING ARTICLES OF GLASSWARE FROM A BLOW STATION TO CONVEYOR MEANS

[75] Inventor: Frank A. Fenton, Doncaster, England

[73] Assignee: Emhart Industries, Inc., Farmington, Conn.

[21] Appl. No.: 755,131

[22] Filed: Jul. 15, 1985

[30] Foreign Application Priority Data

Aug. 3, 1984 [GB] United Kingdom ................ 8419916

[51] Int. Cl.[4] .............................................. C03B 9/28
[52] U.S. Cl. .......................................... 65/79; 65/241; 65/260; 198/414
[58] Field of Search ....................... 65/77, 85, 79, 241, 65/260; 198/414

[56] References Cited

U.S. PATENT DOCUMENTS

| | | | |
|---|---|---|---|
| 3,914,120 | 10/1975 | Foster | 65/241 X |
| 3,934,998 | 1/1976 | Rowe | 65/241 X |
| 4,137,061 | 1/1979 | Mallory et al. | 65/260 X |
| 4,244,725 | 1/1981 | Fenton | 65/260 |
| 4,255,178 | 3/1981 | Braithwaite | 65/241 X |
| 4,255,179 | 3/1981 | Foster | 65/79 |
| 4,494,973 | 1/1985 | Perry | 65/260 |

Primary Examiner—Robert Lindsay
Attorney, Agent, or Firm—H. Samuel Kieser

[57] ABSTRACT

Two gripping means (50 and 58) are used alternately to transfer articles (16) from a blow station (14) to conveyor belts (20). The gripping means are mounted on a carriage (30) which is movable transversely of the blow station to move the gripping means in turn into alignment with the blow station or above one of the conveyor belts. Horizontal moving means (66 and 70) is associated with each gripping means to move it to and from the blow station to collect articles. Vertical moving means (42) is associated with each gripping means to move it downwardly on the carriage to release articles on to one of the conveyor belts.

9 Claims, 2 Drawing Figures

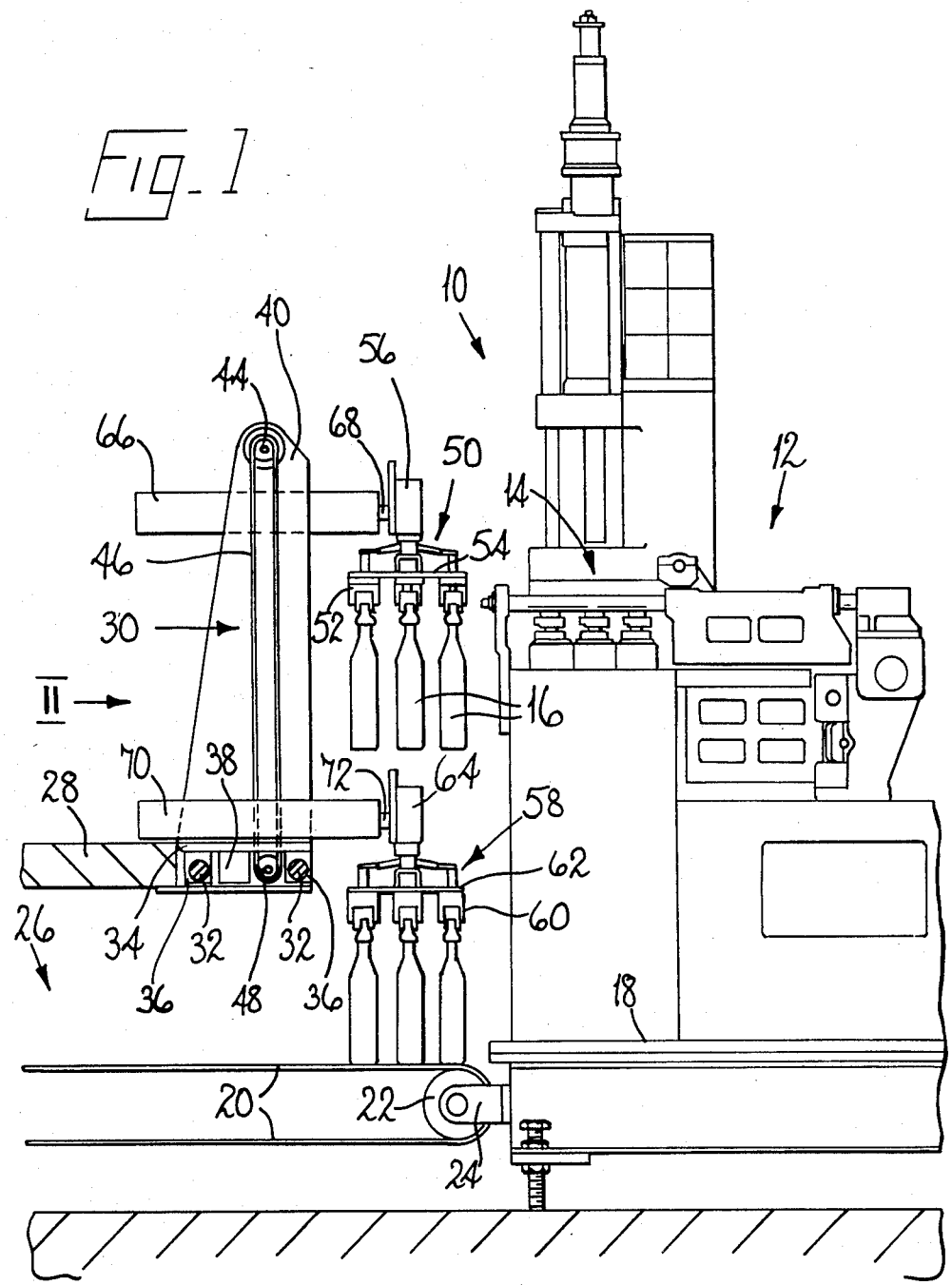
Fig_1

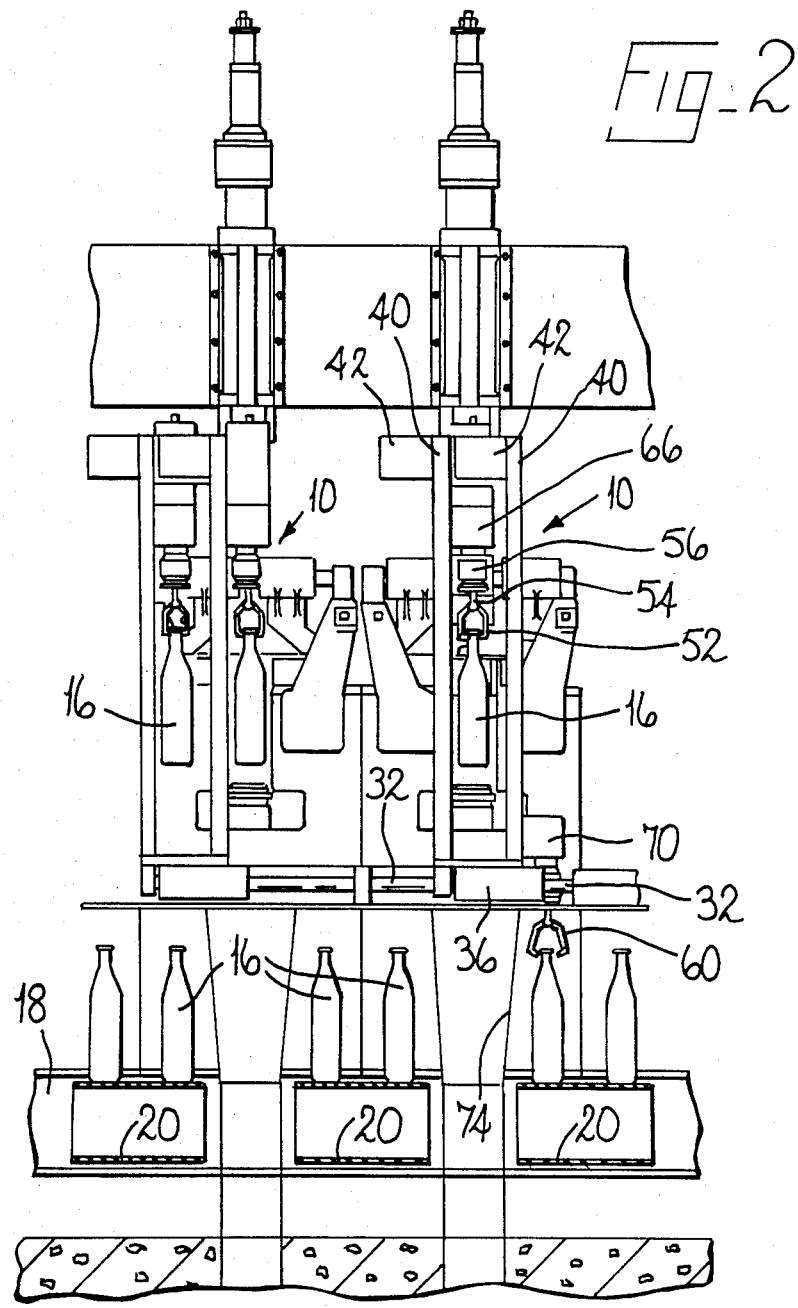
Fig_2

METHOD AND APPARATUS FOR TRANSFERRING ARTICLES OF GLASSWARE FROM A BLOW STATION TO CONVEYOR MEANS

BACKGROUND OF THE INVENTION

This invention is concerned with transferring articles of glassware from a blow station to conveyor means. In particular, the invention is concerned with a glassware handling system for transferring formed articles of glassware from a blow station of a glassware forming machine to conveyor means and with a method of transferring successively-formed articles of glassware from a blow station of a glassware forming machine to conveyor means.

In a conventional glassware forming machine of the individual section type, a plurality of sections, each of which is an individual glassware forming unit, are arranged side-by-side to receive gobs of molten glass from a common source and to feed their output to a common conveyor which runs transversely of the sections. The sections each comprise a blank station at which gobs of molten glass are formed into parisons by either a pressing or a blowing operation, a blow station at which parisons are blown into articles of glassware, and take-out means for transferring formed articles from the blow station to a dead plate from which the articles are pushed on to the conveyor.

The take-out means of a conventional machine comprises tongs operable to grip or release articles and means for moving the tongs between the blow station and the dead plate. The conveyor transfers the articles to a transfer wheel which transfers them to a lehr mat which transfers them into a lehr for annealing. The articles thus come into contact with the take-out tongs, the dead plate, the conveyor, the transfer wheel, and the lehr mat. As each contact is a potential source of damage to the articles, the articles are contacted an undesirable number of times.

In U.K. Patent Specification No. 1598539 (U.S. Pat. No. 4,244,725), there is described a glassware handling system for transferring formed articles of glassware from a blow station of a glassware forming machine to a lehr mat. This system involves less contacts with the articles than the conventional system described above and, furthermore, is more readily able to cope with higher production rates which may be achieved, for example, by using a machine as described in U.K. Patent Specification No. 1491859 (U.S. Pat. No. 3,914,120) in which an intermediate station is provided between the blank station and the blow station, the provision of this intermediate station allowing increased production. This glassware handling system comprises a carriage which is supported on horizontal guide rods which are supported above the lehr and the blow station. The carriage is movable along the guide rods transversely of the lehr and the blow station by operation of a piston and cylinder assembly. The carriage supports two horizontally-extending piston and cylinder assemblies each of which has a piston rod on which a head is mounted, the assemblies being operable to move the heads to positions above the blow station, above a lehr mat which enters the lehr, or above a dead plate located between the blow station and the lehr mat. Each head comprises one or more pairs of tongs for gripping and releasing articles of glassware and a vertically-extending piston and cylinder assembly operable to raise or lower the tongs.

In the operation of the glassware handling system described in U.K. Patent Specification No. 1598539, one of the heads is positioned above the blow station and the tongs thereof grip one or more articles of glassware, the head is then moved substantially horizontally to a position above the dead plate, the carriage is then moved horizontally to move this head away from the centre-line of the blow station and to move the other head on to the centre-line so that it can be moved to collect the next article or articles of glassware from the blow station, the first-mentioned head is then raised to bring articles supported thereby level with the lehr mat, the head is then positioned above the lehr mat and the tongs release the article or articles so that they are carried into the lehr by movement of the lehr mat.

The glassware handling system described in U.K. Patent Specification No. 1598539 has substantial advantages over the conventional system described above. For example, the articles are only handled by the tongs between the blow station and the lehr mat reducing the possibilities for damage to the articles, each machine section is truly independent and can be closed down, speeded up, or slowed down without effecting other sections, and the use of two heads allows increased cooling time and/or higher production. However, the system has the substantial disadvantage of reducing accessibility to the blow station. Whereas in the conventional system, the blow station can be reached by leaning across the conveyor and the dead plate, in the system described in U.K. Patent Specification No. 1598539, the lehr is in the way and access can only be obtained by climbing on top of the lehr and reaching across a portion of the lehr mat and the dead plate.

It is an object of the present invention to provide a glassware handling system which retains the advantages of the system described in U.K. Patent Specification No. 1598539 but gives improved access to the blow station.

BRIEF SUMMARY OF THE INVENTION

The invention provides a glassware handling system for transferring formed articles of glassware from a blow station of a glassware forming machine to conveyor means, the system comprising a carriage, first gripping means mounted for movement with the carriage and operable to grip or release articles of glassware, second gripping means mounted for movement with the carriage and operable to grip or release articles of glassware, carriage moving means operable to move the carriage transversely of the blow station between a first position of the carriage in which the first gripping means is in alignment with the blow station and a second position of a carriage in which the second gripping means is in alignment with the blow station, first horizontal moving means which supports the first gripping means, is mounted for movement with the carriage, and is operable to move the first gripping means horizontally relative to the carriage between a position in which, when the carriage is in its first position, the first gripping means is above the blow station, and a position in which, when the carriage is in its second position, the first gripping means is above the conveyor means, second horizontal moving means which supports the second gripping means, is mounted for movement with the carriage, and is operable to move the second gripping means horizontally relative to the carriage between a position in which, when the carriage is in second position, the second gripping means is above the blow station, and a position in which, when the carriage is in its first position, the second gripping means is above the conveyor means, first vertical moving means operable to move the first horizontal moving means vertically relative to the carriage to move the first gripping means between a first level at which it can grip articles at the blow station and a second, lower, level at which it can release articles on to the conveyor means, and second vertical moving means operable to move the second horizontal moving means vertically relative to the carriage to move the second gripping means between the first and the second levels.

In a glassware handling system according to the last preceding paragraph, the conveyor means can be positioned at a much lower level than in the system described in U.K. Patent Specification No. 1598539, enabling the lehr to be constructed with its top at conveniently low level so that access to the blow station is facilitated.

Since it is desirable to control the movement of the gripping means when carrying hot glass, to prevent excessive swinging of the articles carried by the gripping means and to position the articles gently on the conveyor means, it is advantageous if the first and the second vertical moving means each comprise a servo means operable to move the associated horizontal moving means and gripping means according to a predetermined position against time curve. The first and the second horizontal moving means may each be mounted on an endless chain which passes around an upper and a lower sprocket on the carriage, the servo means being operable to drive one of said sprockets.

In the glassware handling system described in U.K. Patent Specification No. 1598539, a facility is provided for rejecting articles which it is known have been wrongly formed. This facility is provided by a cullet chute which is beneath the dead plate, the dead plate being pivotal to provide access to the cullet chute and the tongs being arranged to release the articles while the heads are above the cullet chute so that the articles fall into the chute. However, this arrangement further reduces the access to the blow station by requiring the presence of the cullet chute between the blow station and the lehr. In order to further increase the access to the blow station, the first gripping means may be arranged to transfer articles to a first conveyor belt of the conveyor means and to the second gripping means may be arranged to transfer articles to a second conveyor belt of the conveyor means, the first and the second gripping means being arranged to release articles which are to be rejected so that the articles fall into a cullet chute disposed between the conveyor belts.

In order to enable articles held by the first or the second gripping means to be cooled for substantially all the time that they are so held, the handling system may also comprise cooling means associated with each gripping means and operable to cool articles gripped thereby, the cooling means being mounted for movement with the gripping means. Alternatively, the cooling means may be mounted on the carriage and adjusted heightwise to match the height of the articles.

The invention also provides a method of transferring successively-formed articles of glassware from a blow station of a glassware forming machine to conveyor means using a first and a second gripping means by which alternately-formed articles or groups of articles are transferred, the method comprising moving the first gripping means transversely of the blow station to a first position in alignment with an at a higher level than the blow station and simultaneously moving the second gripping means transversely of the blow station to a second position out of alignment with the blow station and above the conveyor means, moving the first gripping means from the first position to a third position above the blow station at which the first gripping means is caused to grip an article or a group of articles, moving the second gripping means downwardly from the second position to a fourth position at which the second gripping means is caused to release an article or a group of articles on to the conveyor means, moving the first gripping means from the third position to the first position, moving the second gripping means from the fourth position to the second position, moving the first gripping means transversely of the blow station to a fifth position out of alignment with the blow station and above the conveyor means and simultaneously moving the second gripping means transversely of the blow station from the second position to the first position, moving the first gripping means downwardly from the fifth position to a sixth position at which the first gripping means is caused to release an article or a group of articles on to the conveyor means, moving the second gripping means from the first position to the third position at which the second gripping means is caused to grip and article or a group of articles, moving the first gripping means from the sixth position to the fifth position, moving the second gripping means from the third position to the first position, and repeating the above-mentioned movements in timed relationship to the operation of the machine so that all articles formed are transferred.

The movement of the first gripping means from the fifth to the sixth position and the movement of the second gripping means from the second to the fourth position may be carried out in accordance with a predetermined position against time curve in order to ensure that the articles are deposited on the conveyor means gently and also to prevent excessive swinging of the articles as they are transferred.

The movements of the first and the second gripping means from the third position to the first position may be carried out in accordance with the predetermined position against time curve in order to further reduce the possibility of the articles swinging during their transfer.

Articles transferred by the first gripping means may be transferred to a first conveyor belt of the conveyor means and articles transferred by the second gripping means may be transferred to a second conveyor belt of the conveyor means, a cullet chute being provided between the conveyor belts beneath the first position so that articles can be rejected by being released at the first position so that they fall into the cullet chute.

BRIEF DESCRIPTION OF THE DRAWINGS

There now follows a detailed description, to be read with reference to the accompanying drawings, of a glassware handling system and a method of transferring articles of glassware from a blow station of a glassware forming machine to conveyor means which are illustrative of the invention. It is to be understood that the illustrative glassware handling system and the illustrative method have been selected for description by way of example and not of limitation of the invention.

In the drawings:

FIG. 1 is a side elevational view of the illustrative glassware handling system and of a glassware forming machine with which the illustrative system is used; and FIG. 2 is a view taken in the direction of the arrow II in FIG. 1 but without showing lehrs associated with the glassware forming machine.

DETAILED DESCRIPTION OF PREFERRED EMBODIMENT OF THE INVENTION

The illustrative glassware forming system is for transferring formed articles of glassware from a blow station of a glassware forming machine of the individual section type. The machine is of the type described in U.K. Patent Specification No. 1491859 and comprises a plurality of sections 10 each of which has a blank forming station (not shown) at which parisons are formed, an intermediate station 12, and a blow station 14 at which the parisons are formed into articles of glassware 16 the sections 10 are arranged side by side on a common base 18. The conveyor means comprises a plurality of conveyor belts 20 (there being one more conveyor belt 20 than the number of sections 10). Each conveyor belt 20 extends from a roller 22 mounted on a bracket 24 which extends from the base 18 in a direction parallel to the centre lines of the sections, i.e. parallel to a line joining the centres of the stations 12 and 14 of a section. The centre of each conveyor belt 20 is aligned with the joining line of two adjacent sections (see FIG. 2) except for the extreme end belts 20 which are aligned with the ends of the machine. Thus, each conveyor belt 20 can receive articles 16 equally readily from two adjacent sections 10 except for the end belts 20 which can receive articles 16 from end sections 10 of the machine. The conveyor belts 20 all lead into one of a plurality of tunnel-like lehrs 26 which are formed at a lower level than the blow station 14 and each have a roof 28. The two end lehrs 26 receive end conveyor belts 20 on which one row of articles can be carried through the lehr and the other lehrs receive belts 20 on which two rows of articles can be carried.

The illustrative glassware handling system operates to transfer articles 16 from one of the sections 10 and similar handling systems operate to transfer articles from the remaining sections. The illustrative glassware handling system comprises a carriage 30 which is mounted for movement in a direction transversely of its associated section 10. The carriage 30 is slideably mounted on two guide rails 32 which extend transversely of the machine across the width of the section 10 and are supported by the roofs 28 of two adjacent lehrs 26. The carriage 30 comprises a base plate 34 extending transversely of the section 10 above the guide rails 32. Two sliders 36 depend from the base plae 34 and embrace the guide rails 32 so that the carriage is slideable on the guide rails 32 and a piston and cylinder assembly 38 is mounted beneath the base plate 34. The piston and cylinder assembly 38 is pneumatically operated to move the carriage 30 along the guide rails 32 between two positions relative to the section 10. Thus, the piston and cylinder assembly 38 forms carriage moving means operable to move the carriage 30 transversely of the blow station 14 between a first position of the carriage and a second position of the carriage. The carriage 30 also comprises two columns 40 which extend vertically upwards from the base plate 34 and are spaced apart by a distance equal to one third of the width of the section 10. Each column 40 supports a DC servo motor 42 (see FIG. 2) at an upper end of the column which is arranged to turn a sprocket 44 mounted on the column. An endless chain 46 passes around the sprocket 44 and a further sprocket 48 mounted beneath the base plate 34 of the carriage 30, the chain 46 passing through holes in the base plate 34. Thus, operation of the DC servo motor 42 is effective to move the endless chain 46 around its path between the sprockets 44 and 48.

The illustrative glassware handling system also comprises first gripping means 50 mounted for movement with the carriage 30 and operable to grip or release articles of glassware 16. As the section 10 is arranged to make three articles 16 simultaneously, first gripping means 50 comprises three pairs of tongs 52 each operable to grip an article 16. The tongs 52 are mounted on a head 54 and a vertically disposed piston and cylinder assembly 56 is operable to open and close all the pairs of tongs 52 simultaneously. The illustrative handling system also comprises second gripping means 58 also mounted for movement with the carriage 30 and operable to grip or release articles of glassware 16, the second gripping means 58 comprising three pairs of tongs 60 mounted on a head 62 and a piston and cylinder assembly 64 for opening and closing the tongs 60. The gripping means 50 or 58 can, thus, grip or release a group of three articles 16. When the carriage 30 is in its first position, the first gripping means 50 is in alignment with the blow station 14, i.e. the tongs 52 are on the centre line of the section 10, and, when the carriage 30 is in its second position, the second gripping means 58 is in alignment with the blow station 14. In the drawings, the carriage 30 is shown in its first position with the first gripping means 50 in alignment with the blow station 14.

The illustrative glassware handling system also comprises first horizontal moving means in the form of a horizontally disposed piston and cylinder assembly 66. The assembly 66 has a piston rod 68 on which the first gripping means 50 is mounted so that the first gripping means 50 is supported by the assembly 66. The assembly 66 is mounted for movement with the carriage 30 being mounted on one of the runs of the endless chain 46. The assembly 66 is operable pneumatically to move the first gripping means 50 horizontally relative to the carriage 30 between a position in which, when the carriage 30 is in its first position, the first gripping means 50 is above the blow station 14, and a position in which, when the carriage is in its second position, the first gripping means is above the conveyor means. The assembly 66 is mounted on the endless chain 46 of the left hand column 40 (viewing FIG. 2) and, when the carriage 30 is in its second position (which is reached by a movement to the left from the condition shown in FIG. 2) is above the conveyor belt 20 which is between the section 10 and the next adjacent section 10 to the left.

The illustrative glassware handling system also comprises second horizontal moving means in the form of a pneumatic piston and cylinder assembly 70 which supports the second gripping means 58 on a piston rod 72 thereof. The assembly 70 is mounted for movement with the carriage 30 being mounted on the endless chain 46 of the right hand column 40 (viewing FIG. 2). The assembly 70 is pneumatically operable to move the second gripping means 58 horizontally relative to the carriage 30 between a position in which, when the carriage 30 is in its second position, the second gripping means is above the blow station 14 and a position in which, when the carriage is in its first position, the second gripping means 58 is above the conveyor means. When the carriage 30 is in its second position, the second gripping means 58 is above a conveyor belt 30 which is to the right of the centre line of the section 10.

The DC servo motors 42 form vertical moving means operable to move the assemblies 66 and 70 vertically relative to the carriage 30 to move the first gripping means 50 between a first level at which it can grip articles at the blow station 14 and a second, lower, level, at which it can release articles on to the conveyor means, and to move the assembly 70 vertically relative to the carriage 30 to move the second gripping means 58 between the first and the second levels.

The first and the second vertical moving means formed by the DC servo motors 42, thus, each comprise a servo means operable to move the associated assembly 66 or 70 and gripping means 50 or 58. The servo motors 42 can be programmed so that the movement is carried out according to a predetermined position against time curve. This curve is arranged to prevent undue swinging of articles carried by the gripping means 50 or 58 and to ensure that the articles 16 are positioned on the conveyor belts 20 gently.

It will be apparent that the first gripping means 50 is arranged to transfer articles 16 to a first conveyor belt 20 of the conveyor means and the second gripping means 58 is arranged to transfer articles to a second conveyor belt of the conveyor means, the first conveyor belt being positioned to the left of the section 10 and the second conveyor belt being positioned to the right of the section 10 (viewing FIG. 2). Between the first and the second conveyor belts 20 a cullet chute 74 is provided and the first and second gripping means 50 and 58 are arranged to release articles which are to be rejected so that the articles 16 fall into the cullet chute 74 disposed between the conveyor belts 20.

In a modification of the illustrative glassware handling system, cooling means may be associated with each gripping means 50 and 58 being mounted to move therewith and being operable to cool articles 16 gripped by the tongs 52 or 60.

The illustrative glassware handling system is used in the illustrative method of transferring successively-formed articles of glassware from a blow station 14 of a glassware forming machine to conveyor means. The illustrative method comprises using the first 50 and the second gripping means 58 alternatively to transfer alternately-formed groups of articles 16. The illustrative method will now be described in detail. The illustrative method comprises operating the piston and cylinder assembly 38 to move the carriage 30 into its first position thereby moving the first gripping means 50 transversely of the blow station to a first position in alignment with and at a higher level than the blow station 14. The motion of the first gripping means 50 occurs at a time when the assembly 66 is at an upper station thereof on the carriage following previous operation of the DC motor 42 to bring it to this position. Simultaneously with the motion of the first gripping means 50 aforementioned, the second gripping means 58 is moved transversely of the blow station 14 by the movement of the carriage 30 to a second position out of alignment with the blow station 14 and above the right hand conveyor belt 20 of the conveyor means. During the aforementioned movements of the gripping means 50 and 58, the first gripping means 50 is not carrying articles 16 while the second gripping means 58 is carrying articles, the second gripping means 58 also being at an upper position on the carriage 30.

Next in the illustrative method, the first gripping means 50 is moved from the first position to a third position above the blow station 14 at which the first gripping means 50 is caused to grip a group of articles 16 by operation of the piston and cylinder assembly 58 to close the tongs 52 around the neck portions of the articles 16. This movement is carried out by operation of the piston and cylinder assembly 66. If desired, the DC servo motor 42 can be operated to move the assembly 66 and the first gripping means 50 slightly downwardly to bring the tongs 52 around the necks of the articles 16. The illustrative method also comprises moving the second gripping means 58 downwardly from the second position to a fourth position at which the second gripping means 58 is caused to release a group of articles 16 on to the right hand conveyor belt 20 of the conveyor means. This movement is carried out by operation of the DC servo motor 42 associated with the gripping means 58 to move the assembly 70 and, therefore, the second gripping means 58 downwardly. The first gripping means is, in the illustrative method, moved from the third position to the first position by operation of the assembly 66. During this movement, the first gripping means 50 is carrying three articles of glassware 16. The downward movement of the second gripping means 58 takes place during the horizontal movements of the first gripping means 50. If desired, when the first gripping means 50 leaves the third position, it may be moved upwardly by operation of the DC motor 42 so that the articles 16 clear bottom plates at the blow station 14. Alternatively, the bottom plates of the moulds at the blow station 14 may be lowered to clear the articles 16. After the first gripping means has reached its first position again and the second gripping means has reached its fourth position, the system has reached the condition shown in the drawings.

Next in the illustrative method, the second gripping means 58 is moved from the fourth position to the second position thereof by operation of the associated servo motor 42. During this time, the first gripping means 50 is holding a group of articles 16 which are cooling. Next, in the illustrative method, the piston and cylinder assembly 38 is operated to move the carriage 30 so that the first gripping means 50 is moved transversely of the blow station 14 to a fifth position thereof out of alignment with the blow station 14 and above the left hand conveyor belt 30 of the conveyor means and simultaneously to move the second gripping means 58 transversely of the blow station from the second position to the first position.

Next in the illustrative method, the DC servo motor 42 associated with the assembly 66 is operated while the assembly 70 is also operated. The first gripping means is therefore moved downwardly from the fifth position to a sixth position at which the first gripping means 50 is caused to release the group of articles 16 on to the left hand conveyor belt 20 by operation of the assembly 56 to open the tongs 52 and the second gripping means 58 is moved from the first position to the third position at which the second gripping means is caused to grip a group of articles 16 by operation of the assembly 64 to close the tongs 60 and the second gripping means 58 is moved from the third position to the first position. The above-mentioned movements are then repeated in timed relationship to the operation of the machine so that all articles 16 formed are transferred to the conveyor means. The speed of the conveyor belts 20 is arranged to be such that when the gripping means 50 and 58 release articles on to the conveyor belts 20 there is space beneath the gripping means for such articles on the conveyor belts 20.

As mentioned above, the movement of the first gripping means 50 from the fifth to the sixth position thereof by operation of the associated DC servo motor 42 is carried out in accordance with a predetermined position against time curve as is the movement of the second gripping means 58 from the second to the fourth position. In a modification of the illustrative system and of the illustrative method, the assemblies 66 and 70 may be replaced by horizontal moving means which can operate according to a predetermined position against time curve. For example, the assemblies may be replaced by hydraulically-operated piston and cylinder assemblies having servo-controlled fluid flow so that the gripping means 50 and 58 are moved from the third position to the first position in accordance with the predetermined position against time curve and also, if desired, from the first position to the third position in accordance with the predetermined position against time curve.

In the illustrative method, articles transferred by the first gripping means 50 are transferred to a first, left hand, conveyor belt 20 of the conveyor means and articles transferred by the second gripping means 58 are transferred to a second, right hand, conveyor belt 20 of the conveyor means and a cullet chute 74 is provided between the conveyor belts 20 beneath the first position so that articles 16 can be rejected by being released at the first position by operation of the assemblies 56 or 64 to open the tongs 52 or 60 so that the articles 16 fall into the cullet chute 74.

When it is desired to obtain access to the blow station 14 an operator can stand on the roof 28 of the lehr 26 and reach over the carriage 30. It will be noted that, in contrast to conventional systems, the operator will not have to reach over hot articles if the section 10 has been stopped.

Furthermore, also in contrast to conventional systems, the path of each article to a lehr is of equal length, not being dependant on the particular section in which the article is made. Furthermore, the path is shorter than in conventional systems so that articles are hotter when they enter a lehr. This leads to energy savings and more uniform annealing.

I claim:

1. A glassware handling system for transferring formed articles of glassware from a blow station of a glassware forming machine to conveyor means, the system comprising a carriage, first gripping means mounted for movement with the carriage and operable to grip or release articles of glassware, second gripping means mounted for movement with the carriage and operable to grip or release articles of glassware, carriage moving means operable to move the carriage transversely of the blow station between a first position of the carriage in which the first gripping means is in alignment with the blow station and a second position of the carriage in which the second gripping means is in alignment with the blow station, first horizontal moving means which supports the first gripping means, is mounted for movement with the carriage, and is operable to move the first gripping means horizontally relative to the carriage between a position in which, when the carriage is in its first position, the first gripping means is above the blow station, and a position in which, when the carriage is in its second position, the first gripping means is above the conveyor means, second horizontal moving means which supports the second gripping means, is mounted for movement with the carriage, and is operable to move the second gripping means horizontally relative to the carriage between a position in which, when the carriage is in its second position, the second gripping means is above the blow station and a position in which, when the carriage is in its first position, the second gripping means is above the conveyor means, first vertical moving means operable to move the first horizontal moving means vertically relative to the carriage to move the first gripping means between a first level at which it can grip articles at the blow station and a second, lower, level at which it can release articles on to the conveyor means, and second vertical moving means operable to move the second horizontal moving means vertically relative to the carriage to move the second gripping means between the first and the second levels.

2. A glassware handling system according to claim 1, wherein the first and the second vertical moving means each comprises a servo means operable to move the associated horizontal moving means and gripping means according to a predetermined position against time curve.

3. A glassware handling system according to claim 2, wherein the first and the second horizontal moving means are each mounted on an endless chain which passes around an upper and a lower sprocket on the carriage, the servo means being operable to drive one of said sprockets.

4. A glassware handling system according to claim 1, wherein the first gripping means is arranged to transfer articles to a first conveyor belt of the conveyor means and the second gripping means is arranged to transfer articles to a second conveyor belt of the conveyor means, and the first and the second gripping means are arranged to release articles which are to be rejected so that the articles fall into a cullet chute disposed between the conveyor belts.

5. A glassware handling system according to claim 1, wherein cooling means is associated with each gripping means and is operable to cool articles gripped thereby, the cooling means being mounted for movement with the gripping means.

6. A method of transferring successively-formed articles of glassware from a blow station of a glassware forming machine to conveyor means using a first and a second gripping means by which alternately-formed articles or groups of articles are transferred, the method comprising moving the first gripping means transversely of the blow station to a first position in alignment with and at a higher lever than the blow station and simultaneously moving the second gripping means transversely of the blow station to a second position out of alignment with the blow station and above the conveyor means, moving the first gripping means from the first position to a third position above the blow station at which the first gripping means is caused to grip an article or a group of articles, moving the second gripping means downwardly from the second position to a fourth position at which the second gripping means is caused to release an article or a group of articles on to the conveyor means, moving the first gripping means from the third position to the first position, moving the second gripping means from the fourth position to the second position, moving the first gripping transversely of the blow station to a fifth position out of alignment with the blow station and above the conveyor means and simultaneously moving the second gripping means transversely of the blow station from the second position to the first position, moving the first gripping means downwardly from the fifth position to a sixth position at which the first gripping means is caused to release an article or a group of articles on to the conveyor means, moving the second gripping means from the first position to the third position at which the second gripping means is caused to grip an article or a group of articles, moving the first gripping means from the sixth position to the fifth position, moving the second gripping means from the third position to the first position, and repeating the above-mentioned movements in timed relationship to the operation of the machine so that all articles formed are transferred.

7. A method according to claim 6, wherein the movement of the first gripping means from the fifth to the sixth position and the movement of the second gripping means from the second to the fourth position are carried out in accordance with a predetermined position against time curve.

8. A method according to claim 6, wherein the movements of the first and second gripping means from the third position to the first position are carried out in accordance with a predetermined position against time curve.

9. A method according to claim 6, wherein articles transferred by the first gripping means are transferred to a first conveyor belt of the conveyor means and articles transferred by the second gripping means are transferred to a second conveyor belt of the conveyor means, a cullet chute being provided between the conveyor belts beneath the first position so that articles can be rejected by being released at the first position so that they fall into the cullet chute.

* * * * *